United States Patent
Koshinaka

(10) Patent No.: US 8,954,327 B2
(45) Date of Patent: Feb. 10, 2015

(54) VOICE DATA ANALYZING DEVICE, VOICE DATA ANALYZING METHOD, AND VOICE DATA ANALYZING PROGRAM

(75) Inventor: Takafumi Koshinaka, Minato-ku (JP)

(73) Assignee: NEC Corporation, Tokyo (JP)

( * ) Notice: Subject to any disclaimer, the term of this patent is extended or adjusted under 35 U.S.C. 154(b) by 435 days.

(21) Appl. No.: 13/383,150

(22) PCT Filed: Jun. 3, 2010

(86) PCT No.: PCT/JP2010/003701
§ 371 (c)(1),
(2), (4) Date: Jan. 9, 2012

(87) PCT Pub. No.: WO2011/007497
PCT Pub. Date: Jan. 20, 2011

(65) Prior Publication Data
US 2012/0116763 A1    May 10, 2012

(30) Foreign Application Priority Data

Jul. 16, 2009  (JP) .................................. 2009-168290

(51) Int. Cl.
*G10L 17/00* (2013.01)
(52) U.S. Cl.
USPC ......................................... 704/246; 704/250
(58) Field of Classification Search
USPC ....................................................... 704/246
See application file for complete search history.

(56) References Cited

U.S. PATENT DOCUMENTS

| 6,029,124 A * | 2/2000 | Gillick et al. ................. 704/200 |
| 6,253,179 B1 * | 6/2001 | Beigi et al. .................... 704/243 |
| 6,556,969 B1 * | 4/2003 | Assaleh et al. ............. 704/256.5 |
| 2003/0014250 A1 * | 1/2003 | Beigi et al. ..................... 704/238 |
| 2007/0106511 A1 * | 5/2007 | Mokhtari et al. ............. 704/249 |
| 2007/0192103 A1 | 8/2007 | Sato et al. |
| 2013/0006635 A1 * | 1/2013 | Aronowitz .................... 704/245 |

FOREIGN PATENT DOCUMENTS

| JP | 2003-022088 A | 1/2003 |
| JP | 2005-140988 A | 6/2005 |
| JP | 2007-218933 A | 8/2007 |
| WO | 2007105409 A1 | 9/2007 |
| WO | WO 2008/126627 A1 | 10/2008 |

OTHER PUBLICATIONS

Reynolds, Douglas A., et al., "Speaker Verification Using Adapted Gaussian Mixture Models", Digital Signal Processing, 2000, pp. 1-23, vol. 10, Nos. 1-3.
Communication dated May 7, 2014 from the Japanese Patent Office in counterpart application No. 2011-522695.

* cited by examiner

*Primary Examiner* — Daniel D Abebe
(74) *Attorney, Agent, or Firm* — Sughrue Mion, PLLC

(57) ABSTRACT

A voice data analyzing device comprises speaker model deriving means which derives speaker models as models each specifying character of voice of each speaker from voice data including a plurality of utterances to each of which a speaker label as information for identifying a speaker has been assigned and speaker co-occurrence model deriving means which derives a speaker co-occurrence model as a model representing the strength of co-occurrence relationship among the speakers from session data obtained by segmenting the voice data in units of sequences of conversation by use of the speaker models derived by the speaker model deriving means.

15 Claims, 10 Drawing Sheets

FIG. 2

| No. | SESSION | UTTERANCE |
|---|---|---|
| 1 | 1 | $X_1^{(1)}$ |
| 2 | | $X_2^{(1)}$ |
| 3 | | $X_3^{(1)}$ |
| 4 | | $X_4^{(1)}$ |
| 5 | | $X_5^{(1)}$ |
| 6 | 2 | $X_1^{(2)}$ |
| 7 | | $X_2^{(2)}$ |
| 8 | | $X_3^{(2)}$ |
| 9 | | $X_4^{(2)}$ |
| 10 | | $X_5^{(2)}$ |
| 11 | | $X_6^{(2)}$ |
| 12 | 3 | $X_1^{(3)}$ |
| 13 | | $X_2^{(3)}$ |
| 14 | | $X_3^{(3)}$ |
| ⋮ | ⋮ | ⋮ |

(a)

| No. | SPEAKER LABEL |
|---|---|
| 1 | $z_1^{(1)} = A$ |
| 2 | $z_2^{(1)} = B$ |
| 3 | $z_3^{(1)} = C$ |
| 4 | $z_4^{(1)} = A$ |
| 5 | $z_5^{(1)} = B$ |
| 6 | $z_1^{(2)} = D$ |
| 7 | $z_2^{(2)} = E$ |
| 8 | $z_3^{(2)} = D$ |
| 9 | $z_4^{(2)} = F$ |
| 10 | $z_5^{(2)} = D$ |
| 11 | $z_6^{(2)} = F$ |
| 12 | $z_1^{(3)} = G$ |
| 13 | $z_2^{(3)} = G$ |
| 14 | $z_3^{(3)} = G$ |
| ⋮ | ⋮ |

(b)

VOICE DATA ANALYZING DEVICE, VOICE DATA ANALYZING METHOD, AND VOICE DATA ANALYZING PROGRAM

CROSS REFERENCE TO RELATED APPLICATIONS

This application is a National Stage of International Application No. PCT/JP2010/003701 filed Jun. 3, 2010, claiming priority based on Japanese Patent Application No. 2009-168290 filed Jul. 16, 2009, the contents of all of which are incorporated herein by reference in their entirety.

TECHNICAL FIELD

The present invention relates to a voice data analyzing device, a voice data analyzing method and a voice data analyzing program, and in particular, to a voice data analyzing device, a voice data analyzing method and a voice data analyzing program used for learning or recognizing speakers from voice data including voices uttered by a plurality of speakers.

BACKGROUND ART

An example of a voice data analyzing device has been described in Non-patent Literature 1. The voice data analyzing device of the Non-patent Literature 1 learns speaker models, each of which specifies the character of voice of each speaker, by use of previously stored voice data of each speaker and speaker labels.

For example, the voice data analyzing device learns the speaker model for each of a speaker A (voice data $X_1$, $X_4$, ...), a speaker B (voice data $X_2$, ...), a speaker C (voice data $X_3$, ...), a speaker D (voice data $X_5$, ...), ....

Thereafter, the voice data analyzing device receives unknown voice data X obtained independently of the stored voice data and executes a matching process of calculating the degree of similarity between each of the learned speaker models and the voice data X based on a definitional equation defined by factors like "the probability that the speaker model generates the voice data X". In this example, the voice data analyzing device outputs speaker IDs (identifiers each identifying a speaker, which correspond to the above A, B, C, D, ...) corresponding to speaker models whose degrees of similarity are ranked high among all speaker models or greater than a prescribed threshold value. In another example, speaker matching means 205 receives unknown voice data X and a certain speaker ID (specified speaker ID) as a data pair and executes a matching process of calculating the degree of similarity between the speaker model having the specified speaker ID and the voice data X. Then, a judgment result indicating whether the degree of similarity exceeds a prescribed threshold value or not (that is, whether the voice data X belongs to the specified speaker ID or not) is outputted.

Meanwhile, a speaker feature extraction device has been described in Patent Literature 1, for example. The speaker feature extraction device generates Gaussian mixture distribution-type acoustic models by executing the learning for each set of speakers belonging to each cluster obtained by the clustering of speakers based on a vocal tract length expansion/contraction coefficient with respect to a standard speaker. By calculating the likelihood of an acoustic sample of a learned speaker with respect to each of the generated acoustic models, the speaker feature extraction device extracts one acoustic model as a feature of the inputted speaker.

CITATION LIST

Patent Literature

Patent Document 1: JP-A-2003-22088

Non-patent Literature

Non-patent Document 1: Douglas A, Reynolds et al., "Speaker Verification Using Adapted Gaussian Mixture Models", Digital Signal Processing, Vol. 10, 2000, pages 19-41

SUMMARY OF INVENTION

Technical Problem

A problem with the techniques described in the Non-patent Literature 1 and the Patent Literature 1 is that relationship between/among speakers cannot be used when there is a certain relationship between/among the speakers. The unavailability of the relationship between/among the speakers leads to deterioration in the recognition accuracy.

In the method described in the Non-patent Literature 1, for example, the speaker model is learned for each speaker independently by using voice data and speaker labels prepared for each speaker independently. Then, the matching process with the inputted voice data X is executed for each speaker model independently. In such a method, the relationship between a speaker and another speaker is not discussed at all.

In the method described in the Patent Literature 1, for example, the clustering of the learned speakers is conducted by determining the vocal tract length expansion/contraction coefficient of each learned speaker with respect to the standard speaker. In such a method, similarly to the method of the Non-patent Literature 1, the relationship between a speaker and another speaker is not discussed at all.

The entrance/exit management (voice authentication) of a security room storing classified information can be taken as a typical example of the application of this type of voice data analyzing device. When the voice data analyzing device is used for such a purpose, the above problem is not so serious since the entrance/exit into/from a security room is made one by one in principle and relationship with other people does not occur basically.

However, there are cases where such an assumption does not hold. In criminal investigation, for example, voice data of kidnappers talking on the phone for demanding a ransom, etc. are sometimes collected and used for subsequent criminal investigation. In such cases, the crime can either be being committed by a single criminal/suspect (one-man crime) or a criminal group (multiple-person crime). The so-called phishing scam (billing fraud) is a typical example. Crimes called "theatrical company-type phishing scam" are increasing in recent years, in which criminals/suspects pretending to be a relative of the victim, a police officer, a lawyer, a person concerned in the case (traffic accident or molestation case, for example), etc. successively come on the phone and skillfully deceive the victim.

It is therefore the primary object of the present invention to provide a voice data analyzing device, a voice data analyzing method and a voice data analyzing program capable of implementing the speaker recognition with high accuracy even for a plurality of speakers.

Solution to Problem

A voice data analyzing device in accordance an aspect of with the present invention comprises: speaker model deriving means which derives speaker models as models each specifying character of voice of each speaker from voice data including a plurality of utterances to each of which a speaker label as information for identifying a speaker has been assigned; and speaker co-occurrence model deriving means which derives a speaker co-occurrence model as a model representing the strength of co-occurrence relationship among the speakers from session data obtained by segmenting the voice data in units of sequences of conversation by use of the speaker models derived by the speaker model deriving means.

A voice data analyzing device in accordance with another aspect of the present invention comprises: speaker model storage means which stores speaker models, as models each specifying character of voice of each speaker, derived from voice data including a plurality of utterances to each of which a speaker label as information for identifying a speaker has been assigned; speaker co-occurrence model storage means which stores a speaker co-occurrence model, as a model representing the strength of co-occurrence relationship among the speakers, derived from session data obtained by segmenting the voice data in units of sequences of conversation; and speaker recognition means which recognizes which speaker is the speaker of each utterance included in a specified piece of voice data by calculating consistency with the speaker models and consistency of the co-occurrence relationship in the whole voice data in regard to each utterance included in the specified voice data by use of the speaker models and the speaker co-occurrence model.

A voice data analyzing method in accordance with an aspect of the present invention comprises: a speaker model deriving step of deriving speaker models as models each specifying character of voice of each speaker from voice data including a plurality of utterances to each of which a speaker label as information for identifying a speaker has been assigned; and a speaker co-occurrence model deriving step of deriving a speaker co-occurrence model as a model representing the strength of co-occurrence relationship among the speakers from session data obtained by segmenting the voice data in units of sequences of conversation by use of the speaker models derived by the speaker model deriving step.

A voice data analyzing method in accordance with another aspect of the present invention comprises a speaker recognition step of recognizing which speaker is the speaker of each utterance included in a specified piece of voice data by calculating consistency with speaker models and consistency of co-occurrence relationship in the whole voice data in regard to each utterance included in the specified voice data by use of the speaker models, as models each specifying character of voice of each speaker derived from voice data including a plurality of utterances to each of which a speaker label as information for identifying a speaker has been assigned, and a speaker co-occurrence model as a model representing the strength of the co-occurrence relationship among the speakers derived from session data obtained by segmenting the voice data in units of sequences of conversation.

A voice data analyzing program in accordance with an aspect of the present invention causes a computer to execute: a speaker model deriving process of deriving speaker models as models each specifying character of voice of each speaker from voice data including a plurality of utterances to each of which a speaker label as information for identifying a speaker has been assigned; and a speaker co-occurrence model deriving process of deriving a speaker co-occurrence model as a model representing the strength of co-occurrence relationship among the speakers from session data obtained by segmenting the voice data in units of sequences of conversation by use of the speaker models derived by the speaker model deriving process.

A voice data analyzing program in accordance with another aspect of the present invention causes a computer to execute a speaker recognition process of recognizing which speaker is the speaker of each utterance included in a specified piece of voice data by calculating consistency with speaker models and consistency of co-occurrence relationship in the whole voice data in regard to each utterance included in the specified voice data by use of the speaker models, as models each specifying character of voice, of each speaker derived from voice data including a plurality of utterances to each of which a speaker label as information for identifying a speaker has been assigned, and a speaker co-occurrence model as a model representing the strength of the co-occurrence relationship among the speakers derived from session data obtained by segmenting the voice data in units of sequences of conversation.

Advantageous Effects of Invention

According to the present invention configured as above, the speaker recognition can be executed in consideration of the relationship among speakers. Therefore, a voice data analyzing device, a voice data analyzing method and a voice data analyzing program capable of implementing the speaker recognition with high accuracy even for a plurality of speakers can be provided.

BRIEF DESCRIPTION OF DRAWINGS

FIG. 2 It depicts an explanatory drawing showing an example of information stored in session voice data storage means and session speaker label storage means.

DESCRIPTION OF EMBODIMENTS

<First Exemplary Embodiment>

Figure 1:
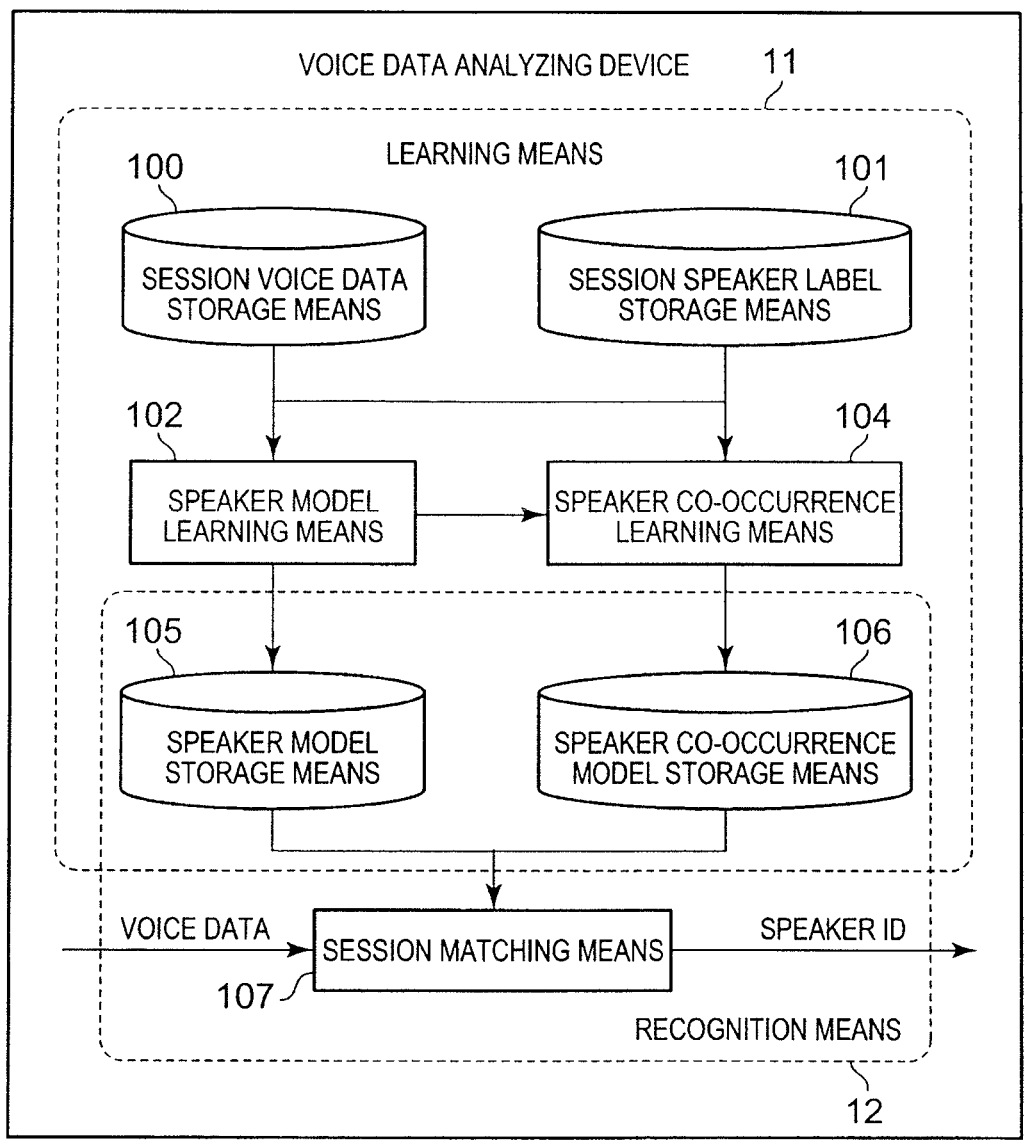
FIG. 1 It depicts a block diagram showing an example of the configuration of a voice data analyzing device in accordance with a first exemplary embodiment.

Hereafter, exemplary embodiments of the present invention are explained with reference to drawings. FIG. 1 is a block diagram showing an example of the configuration of a voice data analyzing device in accordance with a first exemplary embodiment of the present invention. As shown in FIG. 1, the voice data analyzing device of this exemplary embodiment comprises learning means 11 and recognition means 12.

The learning means 11 includes session voice data storage means 100, session speaker label storage means 101, speaker model learning means 102, speaker co-occurrence learning means 104, speaker model storage means 105 and speaker co-occurrence model storage means 106.

The recognition means 12 includes session matching means 107, the speaker model storage means 105 and the speaker co-occurrence model storage means 106. The recognition means 12 shares the speaker model storage means 105 and the speaker co-occurrence model storage means 106 with the learning means 11.

The outline of the operation of these means is as follows: First, the learning means 11 learns speaker models and a speaker co-occurrence model by use of voice data and speaker labels by the operation of each means included in the learning means 11.

In this exemplary embodiment, the session voice data storage means 100 stores many pieces of voice data to be used by the speaker model learning means 102 for the learning. The voice data may either be a voice signal recorded with some sort of recorder or a feature vector sequence (e.g., mel-frequency cepstrum coefficients (MFCCs)) acquired by conversion. While there is no particular restriction on the duration of the voice data, longer duration is generally considered to be better. Each piece of voice data may either be voice data generated in a form in which only a single speaker speaks or in a form in which a plurality of speakers successively speak. For example, in the aforementioned phishing scams, not only voice data collected from a criminal act committed by a single person (one-man crime) but also voice data of voices (lines) successively uttered on the phone by a plurality of members of a criminal group may be included in the voice data. Each piece of voice data recorded as such a sequence of conversations will hereinafter be referred to as a "session". In the case of a phishing scam, one criminal act corresponds to one session.

Incidentally, each piece of voice data is assumed to have been segmented into appropriate units by removing non-voice intervals. The unit of the segmentation will hereinafter be referred to as an "utterance". When a piece of voice data has not been segmented yet, the voice data can easily be converted into a segmented form by detecting only voice intervals by use of voice detection means (unshown).

The session speaker label storage means 101 stores speaker labels to be used by the speaker model learning means 102 and the speaker co-occurrence learning means 104 for the learning. The speaker label is an ID which has been assigned to each utterance of each session for uniquely identifying the speaker. FIG. 2 is an explanatory drawing showing an example of information stored in the session voice data storage means 100 and the session speaker label storage means 101. An example of information stored in the session voice data storage means 100 is shown in FIG. 2(a), while an example of information stored in the session speaker label storage means 101 is shown in FIG. 2(b). In the example shown in FIG. 2(a), utterances $X_k^{(n)}$ constituting each session have been stored in the session voice data storage means 100. In the example shown in FIG. 2(b), each speaker label $z_k^{(n)}$ corresponding to each utterance has been stored in the session speaker label storage means 101. Here, $X_k^{(n)}$ and $z_k^{(n)}$ represent the k-th utterance and speaker label in the n-th session, respectively. Each utterance $X_k^{(n)}$ is generally processed as a feature vector sequence such as mel-frequency cepstrum coefficients (MFCCs) as shown in the following expression (1), wherein $L_k^{(n)}$ represents the number of frames of the utterance $X_k^{(n)}$ that is, the length of the utterance $X_k^{(n)}$:

[Eq. 1]

$$X_k^{(n)} = (x_{k,1}^{(n)}, x_{k,2}^{(n)}, \ldots, x_{k,L_k^{(n)}}^{(n)}) \quad (1)$$

The speaker model learning means 102 learns a model of each speaker by use of the voice data and the speaker labels stored in the session voice data storage means 100 and the session speaker label storage means 101. For example, the speaker model learning means 102 sets a model specifying the character of the voice of each speaker (mathematical formula model such as a probability model) as the speaker model and derives parameters of the speaker model. The concrete method of the learning may be set according to the aforementioned Non-patent Literature 1. Specifically, for each speaker A, B, C, . . . , parameters of a probability model specifying the appearance probability (occurrence probability) of a voice feature quantity of the speaker (e.g., Gaussian mixture model (GMM)) may be determined from a whole set of data (like the one shown in FIG. 2) by using all the utterances to which the speaker label of the speaker has been assigned.

The speaker co-occurrence learning means 104 learns a speaker co-occurrence model (a model aggregating the co-occurrence relationship among the speakers) by use of the voice data stored in the session voice data storage means 100, the speaker labels stored in the session speaker label storage means 101 and each speaker model determined by the speaker model learning means 102. The strength of human relationship between/among speakers varies depending on the speakers as mentioned in "Problem to be Solved by the Invention". If we consider the connections among speakers as a network, the network is not homogeneous and includes parts where the connection is strong or weak. When viewed in perspective, the network looks like a group of especially strongly connected sub-networks (clusters) scattered in space.

In the learning executed by the speaker co-occurrence learning means 104, such clusters are extracted and a mathematical formula model (probability model) representing each cluster is derived.

Next, the operation of the speaker model learning means 102 and the speaker co-occurrence learning means 104 will be described in more detail.

First of all, the speaker model learned by the speaker model learning means 102 is a probability model specifying the probability distribution of each utterance X. The probability model can be expressed by a state transition diagram like the one shown in FIG. 3. Strictly speaking, the model of each speaker i (i=1, 2, ..., S) is represented by the following probability density function (2):

[Eq. 2]

$$p(X \mid a_i, \lambda_i)(1 - a_i) = p(x_i, \ldots, x_i \mid a_i, \lambda_i) = (1 - a_i)^{L-1} a_i \prod_{i=1}^{L} f(x_i \mid \lambda_i) \quad (2)$$

Such a probability model is called a "1-state hidden Markov model". Especially, each parameter $a_i$ is called a "state transition probability". Each factor "f" represents a function that is specified by a parameter $\lambda_i$. Each function f specifies the distribution of each feature vector $x_i$ constituting the utterance. The entity of the speaker model is the parameters $a_i$ and $\lambda_i$. The learning executed by the speaker model learning means 102 can be considered as determining the values of these parameters. A Gaussian mixture distribution (GMM), etc. can be taken as an example of the concrete functional form of the function f. The speaker model learning means 102 calculates the parameters $a_i$ and $\lambda_i$ according to such a learning method and stores the calculated parameters $a_i$ and $\lambda_i$ in the speaker model storage means 105.

Figure 4:
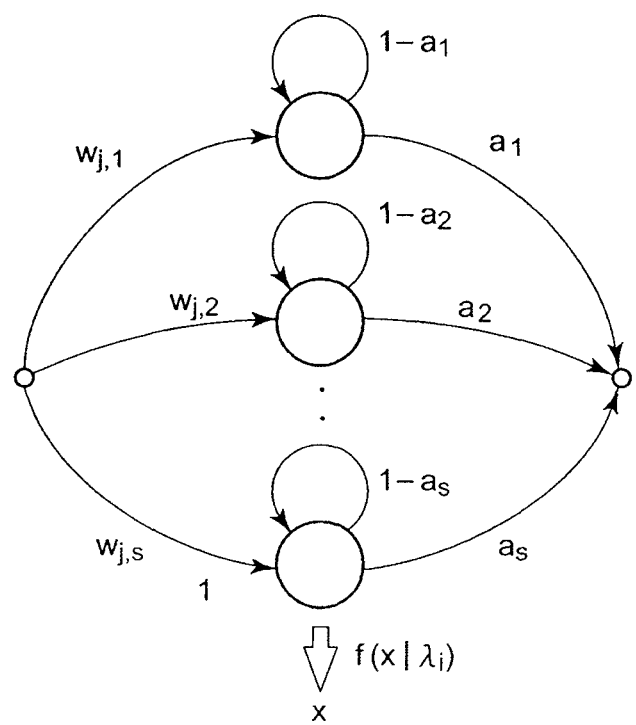
FIG. 4 It depicts a state transition diagram schematically showing a base unit of a speaker co-occurrence model.
Figure 5:
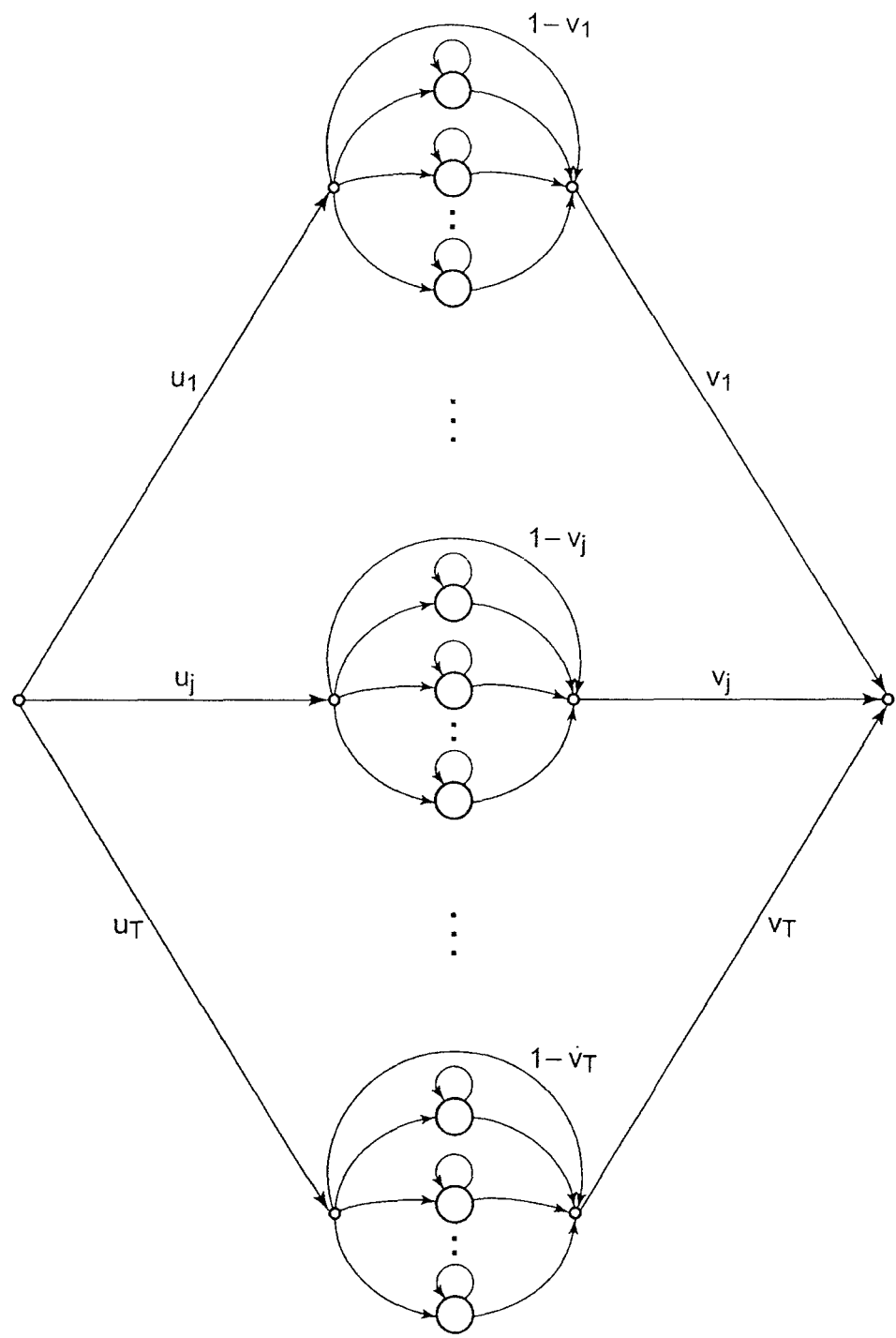
FIG. 5 It depicts a state transition diagram schematically showing a speaker co-occurrence model.

Next, the speaker co-occurrence model learned by the speaker co-occurrence learning means 104 can be represented by a state transition diagram like the one shown in FIG. 5 (Markov network). In the state transition diagram (Markov network) shown in FIG. 5, a state transition diagram like the one shown in FIG. 4 (in which the aforementioned speaker models of the speakers i (i=1, 2, ..., S) are arranged in parallel) is used as a base unit and T base units are arranged in parallel.

Each $w_{ji}$ (j=1, 2, ..., T, i=1, 2, ..., S) in FIG. 4 represents a parameter indicating the appearance probability of the speaker i in a set (cluster) j of speakers ($w_{j,1} + \ldots + w_{j,s}=1$). There are T patterns of $w_{ji}$ depending on j. If $w_{ji}=0$, it means that the speaker i never appears. In contrast, speakers satisfying $w_{ji}>0$ have a possibility of co-occurrence, that is, have a human relationship among them. A set of speakers satisfying $w_{ji}>0$ corresponds to a cluster in the network of speakers. In the example of the theatrical company-type phishing scam, such a set of speakers satisfying $w_{ji}>0$ can be considered to represent a typical criminal group.

The probability model represented by the Markov network of FIG. 5 is a model obtained by considering the state transition diagram of FIG. 4 to represent a criminal group of a phishing scam and assuming that criminal groups can be roughly classified into T patterns. In FIG. 5, each $u_j$ is a parameter representing the appearance probability of a criminal group, that is, the set (cluster) j of speakers. The parameter $u_j$ can be interpreted as the level of activeness of the criminal group's activity. Each $v_j$ is a parameter relating to the number of utterances in one session of the speaker set j. The entity of the speaker co-occurrence model is the parameters $u_j$, $v_j$ and $w_{ji}$. The learning executed by the speaker co-occurrence learning means 104 can be considered as determining the values of these parameters.

Let $\theta = \{u_j, v_j, w_{ji}, a_i, \lambda_i\}$ represent the set of parameters which have been defined so far, a probability model specifying the probability distribution of a session $\Xi = (X_1, X_2, \ldots, X_K)$ made up of K utterances is represented by the following expression (3):

[Eq. 3]

$$P(\Xi \mid \theta) = \sum_{y,z} P(\Xi, y, Z \mid \theta) = \sum_{y,z} u_y (1 - v_y)^{k-1} v_y \prod_{k=1}^{K} w_{y Z_k} F(X_k \mid a_{Zk}, \lambda_{Zk}) \quad (3)$$

In the expression (3), y is an index specifying a speaker set (cluster) and $Z=(z_1, z_2, \ldots, z_K)$ is an index sequence specifying a speaker in regard to each utterance. For the simplification of notation, a replacement shown in the following expression (4) has been made:

[Eq. 4]

$$F(X_k \mid a_{Zk}, \lambda_{Zk}) = (1 - a_{Zk})^{Lk-1} a_{Zk} \prod_{l=1}^{Lk} f(x_{kl} \mid \lambda_{Zk}) \quad (4)$$

The speaker co-occurrence learning means 104 estimates the parameters $u_j$, $v_j$ and $w_{ji}$ using the voice data $X_k^{(n)}$ stored in the session voice data storage means 100, the speaker labels $z_k^{(n)}$ stored in the session speaker label storage means 101 and the models $a_i$ and $\lambda_i$ of the speakers determined by the speaker model learning means 102. While several estimation methods are possible, a method based on the maximum likelihood criterion is generally used. Specifically, the estimation is performed so as to maximize the probability $p(\Xi|\theta)$ in the aforementioned expression (3) for the voice data, the speaker labels and the models of the speakers which have been given.

Concrete calculations based on the maximum likelihood criterion can be executed according to the expectation-maximization algorithm (abbreviated as "EM algorithm"), for example. Specifically, in steps S0-S3 which will be described below, an algorithm alternately repeating the steps S1 and S2 is executed.

Step S0:

Appropriate values are set to the parameters $u_j$, $v_j$ and $w_{ji}$,

Step S1:

The probability that the session $\Xi^{(n)}$ belongs to each cluster y is calculated according to the following expression (5), where $K^{(n)}$ represents the number of utterances included in the session $\Xi^{(n)}$:

[Eq. 5]

$$P(y \mid \Xi^{(n)}, \theta) = \frac{u_y(1 - v_y)^{K^{(n)}-1} v_y \prod_{k=1}^{K^{(n)}} \sum_{i=1}^{S} w_{y Z_k^{(n)}} F(X_k \mid a_i, \lambda_i)}{\sum_{j=1}^{T} u_j (1 - v_n)^{K(n)-1} v_j \prod_{k=1}^{K^{(n)}} \sum_{i=1}^{S} w_{j Z_k^{(n)}} F(X_k \mid a_i, \lambda_i)} \quad (5)$$

Step S2:

The parameters $u_j$, $v_j$ and $w_{ji}$ are updated according to the following expression (6), where N represents the total number of sessions and $\delta_{ij}$ represents the Kronecker delta:

[Eq. 6]

$$u_y \leftarrow \frac{1}{N} \sum_{n=1}^{N} p(y \mid \Xi^{(n)}, \theta) \quad (6)$$

$$v_y \leftarrow \frac{\sum_{n=1}^{N} p(y \mid \Xi^{(n)}, \theta)}{\sum_{n=1}^{N} K^{(n)} p(y \mid \Xi^{(n)}, \theta)}$$

$$w_{yz} \leftarrow \frac{\sum_{n=1}^{N} \sum_{k=1}^{K^{(n)}} \delta_{zz_k^{(n)}} p(y \mid \Xi^{(n)}, \theta)}{\sum_{n=1}^{N} K^{(n)} p(y \mid \Xi^{(n)}, \theta)}$$

Step S3:

Thereafter, while making a convergence judgment, for example, based on the degree of increase in the value of the probability $p(\Xi|\theta)$ in the aforementioned expression (3), the steps S1 and S2 are alternately repeated until the convergence is confirmed.

The speaker co-occurrence model (i.e., the parameters $u_j$, $v_j$ and $w_{ji}$) which has been calculated by the above steps is stored in the speaker co-occurrence model storage means 106.

On the other hand, the recognition means 12 recognizes speakers included in an arbitrarily given piece of voice data by the operation of each means included in the recognition means 12.

In this exemplary embodiment, the session matching means 107 receives an arbitrary piece of voice data.

Similarly to the voice data processed by the learning means 11, the voice data processed by the session matching means 107 may either be voice data generated in a form in which only a single speaker speaks or in a form of an utterance sequence in which a plurality of speakers successively speak. Similarly to the above explanation, such voice data will be expressed as $\Xi=(X_1, X_2, \ldots, X_K)$ and $\Xi$ will be called a session.

The session matching means 107 further estimates which speaker made each utterance included in the session $\Xi$, that is, estimates a speaker label sequence $Z=(z_1, z_2, \ldots, z_K)$ by referring to the speaker models and the speaker co-occurrence model which have been calculated by the learning means 11 and stored in the speaker model storage means 104 and the speaker co-occurrence model storage means 106, respectively. Specifically, when session voice data $\Xi$ and parameters $\theta=\{u_j, v_j, w_{ji}, a_i, \lambda_i\}$ have been given, the probability distribution of the speaker label sequence Z can be calculated theoretically according to the following expression (7):

[Eq. 7]

$$p(Z \mid \Xi, \theta) = \frac{\sum_{j=1}^{T} u_n (1-v_j)^{K-1} v_j \prod_{k=1}^{K} w_{jz_k} F(X_k \mid a_{X_k}, \lambda_{X_k})}{\sum_{j=1}^{T} u_n (1-v_j)^{K-1} v_j \prod_{k=1}^{K} \sum_{i=1}^{S} w_{ji} F(X_k \mid a_{X_k}, \lambda_{X_k})} \quad (7)$$

Therefore, the speaker label of each utterance can be figured out by determining Z that maximizes the probability $p(\Xi|\theta)$. Incidentally, the calculation of the denominator on the right side of the expression (7) can be omitted since the denominator is a constant independent of Z. In the numerator, the summation regarding the clusters j may also be carried out by an approximate calculation by replacing it with maximum value calculation $\max_j$, as is commonly done in this type of calculation. While the number of combinations of values that can be taken on by the speaker label sequence Z is as large as $S^K$ and the search for the maximum value of the probability $p(\Xi|\theta)$ can need an enormous number of calculations, the search can be conducted efficiently by use of appropriate calculation techniques such as dynamic programming.

It has been assumed in the above-described operation that the voice data inputted to the recognition means 12 is composed exclusively of utterances by speakers already learned by the learning means 11. In actual application, however, there can be cases where voice data including an utterance by an unknown speaker (not yet acquired by the learning means 11) is inputted. In such cases, postprocessing for judging whether the speaker of each utterance is an unknown speaker or not can be introduced with ease. Specifically, it is possible to calculate the probability that each utterance $X_k$ belongs to the speaker $z_k$ according to the following expression (8) and judge that the speaker of the utterance is an unknown speaker when the calculated probability does not exceed a prescribed threshold value.

[Eq. 8]

$$p(z_k \mid \Xi, \theta) = \frac{\sum_{j=1}^{T} u_j (1-v_j)^{k-1} v_j \left\{ \prod_{k'=1}^{k-1} \sum_{k=1}^{S} w_{ji} F(X_{k'} \mid a_i, \lambda_i) \right\} w_{jz_k}}{\sum_{j=1}^{T} u_j (1-v_j)^{k-1} v_j \prod_{k'=1}^{K} \sum_{i=1}^{S} w_{ji} F(X_{k'} \mid a_i, \lambda_i)} \quad (8)$$

An approximate calculation like the following expression (9) may also be performed instead of the above calculation (8).

[Eq. 9]

$$p(z_k \mid X_k, \theta) \approx \frac{\sum_{j=1}^{T} w_{jz_k} F(X_k \mid a_{z_k}, \lambda_{z_k})}{\sum_{j=1}^{T} \sum_{i=1}^{S} w_{ji} F(X_{k'} \mid a_{z_k}, \lambda_{z_k})} \quad (9)$$

While the right side of the expression (8) or (9) includes a summation form regarding the speaker models $i=1, \ldots, S$, the calculation may also be carried out by replacing the summation form with an average speaker model (i.e., universal background model) described in the Non-patent Literature 1.

In this exemplary embodiment, the session voice data storage means 100, the session speaker label storage means 101, the speaker model storage means 105 and the speaker co-occurrence model storage means 106 are implemented by, for example, a storage device such as a memory. The speaker model learning means 102, the speaker co-occurrence learning means 104 and the session matching means 107 are implemented by, for example, an information processing device (processor unit) operating according to a program (e.g., CPU). Incidentally, the session voice data storage means 100, the session speaker label storage means 101, the speaker model storage means 105 and the speaker co-occurrence model storage means 106 may also be implemented as separate storage devices. Similarly, the speaker model learning means 102, the speaker co-occurrence learning means 104 and the session matching means 107 may also be implemented as separate units.

Figure 6:
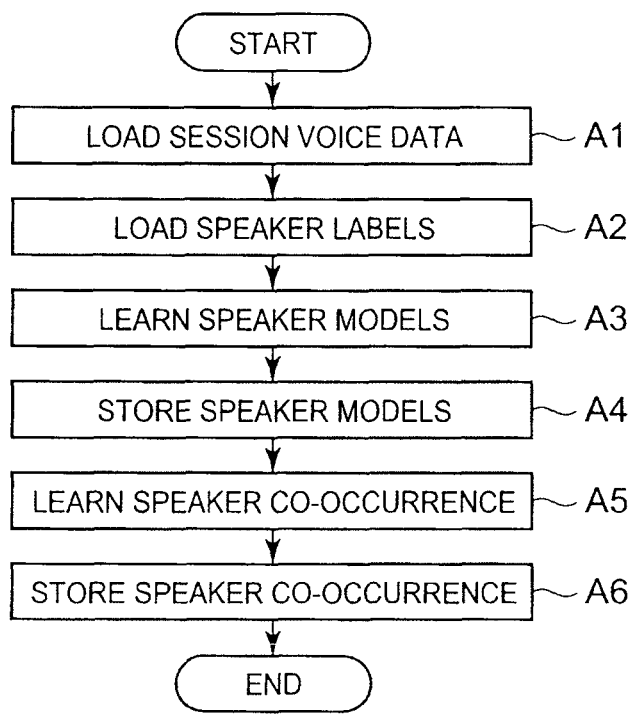
FIG. 6 It depicts a flow chart showing an example of the operation of learning means in the first exemplary embodiment.
Figure 7:
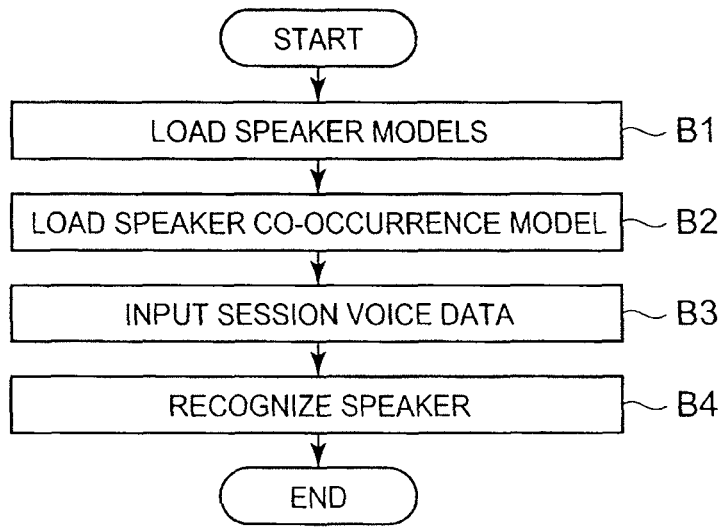
FIG. 7 It depicts a flow chart showing an example of the operation of recognition means in the first exemplary embodiment.

Next, the overall operation of this exemplary embodiment will be described in detail referring to flow charts of FIGS. 6 and 7. FIG. 6 is a flow chart showing an example of the operation of the learning means 11. FIG. 7 is a flow chart showing an example of the operation of the recognition means 12.

First, the speaker model learning means 102 and the speaker co-occurrence learning means 104 in the learning means 11 load voice data from the session voice data storage means 100 (step A1 in FIG. 6). The speaker model learning means 102 and the speaker co-occurrence learning means 104 further load speaker labels from the session speaker label storage means 101 (step A2). The loading of these data may be executed in an arbitrary order. It is unnecessary to synchronize the data loading timing between the speaker model learning means 102 and the speaker co-occurrence learning means 104.

Subsequently, the speaker model learning means 102 calculates the speaker models (i.e., the parameters $a_i$ and $\lambda_i$ (i=1, . . . , S)) by use of the loaded voice data and speaker labels (step A3) and stores the calculated speaker models (parameters $a_i$ and $\lambda_i$) in the speaker model storage means 105 (step A4).

The speaker co-occurrence learning means 104 calculates the speaker co-occurrence model (i.e., the parameters $u_j$, $v_j$ and $w_{ji}$ (i=1, . . . , S, j=1, . . . , T)) by executing prescribed calculations (e.g. the iterative solution method including the aforementioned calculations (5) and (6)) using the voice data, the speaker labels and the speaker models calculated by the speaker model learning means 102 (step A5). The speaker co-occurrence learning means 104 stores the calculated speaker co-occurrence model (parameters $u_j$, $v_j$ and $w_{ji}$) in the speaker co-occurrence model storage means 106 (step A6).

In the recognition means 12, the session matching means 107 loads the speaker models from the speaker model storage means 105 (step B1 in FIG. 7) and loads the speaker co-occurrence model from the speaker co-occurrence model storage means 106 (step B2). The session matching means 107 receives an arbitrary piece of voice data (step B3) and determines the speaker labels corresponding to the utterances included in the received voice data by executing a prescribed calculation such as the aforementioned calculation (7) (and the calculation (8) or (9) as needed).

As described above, according to this exemplary embodiment, the speaker co-occurrence learning means 104 in the learning means 11 acquires (generates) the co-occurrence relationship among speakers as the speaker co-occurrence model by using the speaker labels and the voice data which have been recorded in units of sessions (each integrating a sequence of utterances in conversation, etc.). In the recognition means 12, the session matching means 107 executes the speaker recognition not for each utterance independently but considering the consistency of the co-occurrence of speakers in the whole session by use of the speaker co-occurrence model acquired by the learning means 11. Therefore, the labels of the speakers can be determined correctly and the speakers can be recognized with high accuracy.

For example, in the aforementioned example of the phishing scam, a relationship between/among speakers develops when the crime is committed by two or more people as in a theatrical company-type phishing scam. For example, there can be various cases such as a case where speakers A and B belong to the same criminal group and thus the speakers are highly likely to appear in one criminal act (telephone conversation) together, a case where speakers B and C belong to different criminal groups and thus the speakers never appearing together, a case where a speaker D commits crimes always without an accomplice (one-man crime), etc. The appearance of a speaker and another speaker together (like the speakers A and B) is referred to as "co-occurrence" in the present invention.

The relationship between/among speakers is critically important information for identifying each speaker (i.e., criminal/suspect). Especially when voice (voice data) is acquired from telephone conversation, the bandwidth is narrow, the sound can be of very poor quality, and the discrimination between speakers is difficult. Therefore, reasoning like "since the speaker A has appeared here, this voice may probably be of the fellow (speaker) B" can be expected to be effective. Thus, the object of the present invention can be achieved by employing the above-described configuration and conducting the speaker recognition in consideration of the relationship between/among speakers.

<Second Exemplary Embodiment>

Figure 8:
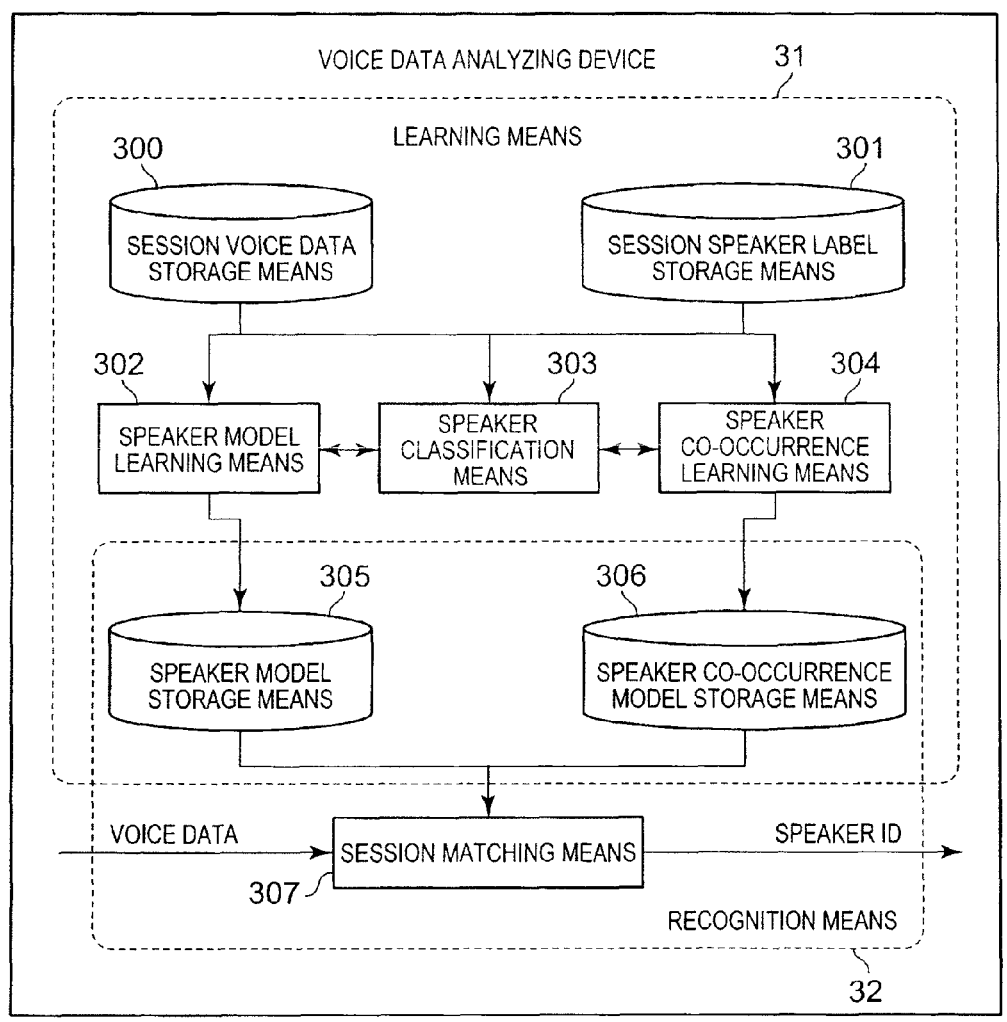
FIG. 8 It depicts a block diagram showing an example of the configuration of a voice data analyzing device in accordance with a second exemplary embodiment.

Next, a second exemplary embodiment of the present invention will be described. FIG. 8 is a block diagram showing an example of the configuration of a voice data analyzing device in accordance with the second exemplary embodiment of the present invention. As shown in FIG. 8, the voice data analyzing device of this exemplary embodiment comprises learning means 31 and recognition means 32.

The learning means 31 includes session voice data storage means 300, session speaker label storage means 301, speaker model learning means 302, speaker classification means 303, speaker co-occurrence learning means 304, speaker model storage means 305 and speaker co-occurrence model storage means 306. The learning means 31 in the second exemplary embodiment differs from the learning means 11 in the first exemplary embodiment in that the speaker classification means 303 is included.

The recognition means 32 includes session matching means 307, the speaker model storage means 304 and the speaker co-occurrence model storage means 306. The recognition means 32 shares the speaker model storage means 304 and the speaker co-occurrence model storage means 306 with the learning means 31.

The outline of the operation of these means is as follows:

Similarly to the first exemplary embodiment, the learning means 31 learns the speaker models and the speaker co-occurrence model by use of voice data and speaker labels by the operation of each means included in the learning means 31. However, the speaker labels may be imperfect differently from the case of the learning means 11 in the first exemplary embodiment. In other words, speaker labels corresponding to part of the sessions/utterances included in the voice data may be unknown. This kind of situation can occur often in actual application since the task of assigning the speaker label to each utterance generally requires a great deal of workforce and cost for listening to and checking voice data, etc.

Except that part of the speaker labels are unknown, the session voice data storage means 300 and the session speaker label storage means 301 are equivalent to the session voice data storage means 100 and the session speaker label storage means 101 in the first exemplary embodiment.

The speaker model learning means 302 learns the model of each speaker using the voice data and the speaker labels stored in the session voice data storage means 300 and the session speaker label storage means 301, estimation result of unknown speaker labels calculated by the speaker classification means 303 and estimation result of a belonging cluster of each session calculated by the speaker co-occurrence learning means 304. Thereafter, the speaker model learning means 302 stores the final speaker models in the speaker model storage means 305.

The speaker classification means 303 stochastically estimates speaker labels that should be assigned to the utterances whose speaker labels are unknown by use of the voice data and the speaker labels stored in the session voice data storage means 300 and the session speaker label storage means 301, the speaker models calculated by the speaker model learning means 302 and the speaker co-occurrence model calculated by the speaker co-occurrence learning means 304.

The speaker co-occurrence learning means 304 stochastically estimates the belonging cluster for each session, refers to the estimation result of the unknown speaker labels calculated by the speaker classification means 303, and thereby learns the speaker co-occurrence model. The speaker co-occurrence learning means 304 stores the final speaker co-occurrence model in the speaker co-occurrence model storage means 306.

Here, the operation of the speaker model learning means 302, the speaker classification means 303 and the speaker co-occurrence learning means 304 will be described in more detail.

Figure 3:
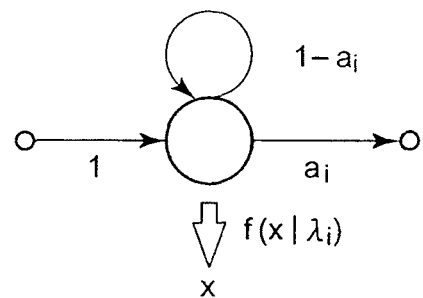
FIG. 3 It depicts a state transition diagram schematically showing a speaker model.

The speaker models learned by the speaker model learning means 302 and the speaker co-occurrence model learned by the speaker co-occurrence learning means 304 are similar to those in the first exemplary embodiment and are expressed by state transition diagrams like the ones shown in FIGS. 3 and 5, respectively. However, since the speaker labels are imperfect, the speaker model learning means 302, the speaker classification means 303 and the speaker co-occurrence learning means 304 execute the learning of the speaker models and the speaker co-occurrence model by operating successively and iteratively depending on the outputs of one another. Specifically, in the following steps S30-S35, estimation is performed by an algorithm that repeats steps S31-S34.

Step S30:

The speaker co-occurrence learning means 304 sets appropriate values to the parameters $u_j$, $v_j$ and $w_{ji}$ ($i=1, \ldots, S$, $j=1, \ldots, T$) of the speaker co-occurrence model. The speaker classification means 303 assigns appropriate labels (values) to the unknown speaker labels using a random number generator, for example.

Step S31:

The speaker model learning means 302 updates the parameters $a_i$ and $\lambda_i$ ($i=1, \ldots, S$) by learning the speaker models using the voice data stored in the session voice data storage means 300, the already-known speaker labels stored in the session speaker label storage means 301 and the speaker labels estimated by the speaker classification means 303. For example, when each speaker model is a Gaussian distribution model specified by an average $\mu_i$ and a variance $\Sigma_i$, that is, when $\lambda_i=(a_i, \mu_i, \Sigma_i)$, these parameters are updated according to the following expression (10):

[Eq. 10]

$$a_z \leftarrow \frac{\sum_{n=1}^{N} \sum_{k=1}^{K^{(n)}} \sum_{y=1}^{T} p(y \mid \Xi^{(n)}, \theta) p(z \mid y, X_k^{(n)}, \theta)}{\sum_{n=1}^{N} \sum_{k=1}^{K^{(n)}} \sum_{y=1}^{T} L_k^{(n)} p(y \mid \Xi^{(n)}, \theta) p(z \mid y, X_k^{(n)}, \theta)} \quad (10)$$

$$u_z \leftarrow \frac{\sum_{n=1}^{N} \sum_{k=1}^{K^{(n)}} \sum_{y=1}^{T} \sum_{i=1}^{L_k^{(n)}} x_{kl}^{(n)} p(y \mid \Xi^{(n)}, \theta) p(z \mid y, X_k^{(n)}, \theta)}{\sum_{n=1}^{N} \sum_{k=1}^{K^{(n)}} \sum_{y=1}^{T} \sum_{i=1}^{L_k^{(n)}} p(y \mid \Xi^{(n)}, \theta) p(z \mid y, X_k^{(n)}, \theta)}$$

$$\Sigma_z \leftarrow \frac{\sum_{n=1}^{N} \sum_{k=1}^{K^{(n)}} \sum_{y=1}^{T} \sum_{i=1}^{L_k^{(n)}} x_{kl}^{(n)} x_{kl}^{(n)T} p(y \mid \Xi^{(n)}, \theta) p(z \mid y, X_k^{(n)}, \theta)}{\sum_{n=1}^{N} \sum_{k=1}^{K^{(n)}} \sum_{y=1}^{T} \sum_{i=1}^{L_k^{(n)}} p(y \mid \Xi^{(n)}, \theta) p(z \mid y, X_k^{(n)}, \theta)} - u_z u_z^T.$$

Step S32:

The speaker classification means 303 stochastically estimates the speaker labels of the utterances whose speaker labels are unknown according to the following expression (11) by use of the voice data stored in the session voice data storage means 300, the speaker models and the speaker co-occurrence model.

[Eq. 11]

$$p(y, X_k^{(n)}, \theta) = \frac{w_{yz} F(X_k^{(n)} \mid a_z, \lambda_Z)}{\sum_{i=1}^{S} w_{yz} F(X_k^{(n)} \mid a_z, \lambda_Z)} \quad (11)$$

Step S33:

The speaker co-occurrence learning means 304 calculates the probability that the session $\Xi^{(n)}$ belongs to each cluster y according to the aforementioned expression (5) by use of the voice data and the already-known speaker labels stored in the session voice data storage means 300 and the session speaker label storage means 301, the speaker models calculated by the speaker model learning means 302 and the estimation result of the unknown speaker labels calculated by the speaker classification means 303.

Step S34:

The speaker co-occurrence learning means 304 further learns the speaker co-occurrence model using the calculation result of the step S33. Specifically, the speaker co-occurrence learning means 304 updates the parameters $u_j$, $v_j$ and $w_{ji}$ ($i=1, \ldots, S, j=1, \ldots, T$) according to the following expression (12):

[Eq. 13]

$$u_y \leftarrow \frac{1}{N} \sum_{n=1}^{N} p(y \mid \Xi^{(n)}, \theta) \quad (12)$$

$$v_y \leftarrow \frac{\sum_{n=1}^{N} p(\mid \Xi^{(n)}, \theta)}{\sum_{n=1}^{N} K^{(n)} p(y \mid \Xi^{(n)}, \theta)}$$

$$w_{yz} \leftarrow \frac{\sum_{n=1}^{N} \sum_{k=1}^{K^{(n)}} p(y \mid \Xi^{(n)}, \theta) p(z \mid y, X_k^{(n)}, \theta)}{\sum_{z'=1}^{S} \sum_{n=1}^{N} \sum_{k=1}^{K^{(n)}} p(y \mid \Xi^{(n)}, \theta) p(z \mid y, X_k^{(n)}, \theta)}$$

Step S35:

Thereafter, the steps S31-S34 are repeated until convergence is confirmed. When the convergence is confirmed, the speaker model learning means 302 stores the speaker models in the speaker model storage means 305 and the speaker co-occurrence learning means 304 stores the speaker co-occurrence model in the speaker co-occurrence model storage means 306.

The above process (steps S31-S35) is one derived from the expectation-maximization algorithm based on the maximum likelihood criterion similarly to the first exemplary embodiment. This derivation is just an example; formulation based on other well-known criteria, such as the maximum a posteriori probability (MAP) criterion and the Bayesian criterion, is also possible.

On the other hand, the recognition means 32 in this exemplary embodiment recognizes speakers included in an arbitrarily given piece of voice data by the operation of each means included in the recognition means 32. Explanation of the detailed operation of the recognition means 32 is omitted since the recognition means 32 is equivalent to the recognition means 12 in the first exemplary embodiment.

In this exemplary embodiment, the session voice data storage means 300, the session speaker label storage means 301, the speaker model storage means 305 and the speaker co-occurrence model storage means 306 are implemented by, for example, a storage device such as a memory. The speaker model learning means 302, the speaker classification means 303, the speaker co-occurrence learning means 304 and the session matching means 307 are implemented by, for example, an information processing device (processor unit) operating according to a program (e.g., CPU). Incidentally, the session voice data storage means 300, the session speaker label storage means 301, the speaker model storage means 305 and the speaker co-occurrence model storage means 306 may also be implemented as separate storage devices. Similarly, the speaker model learning means 302, the speaker classification means 303, the speaker co-occurrence learning means 304 and the session matching means 307 may also be implemented as separate units.

Figure 9:
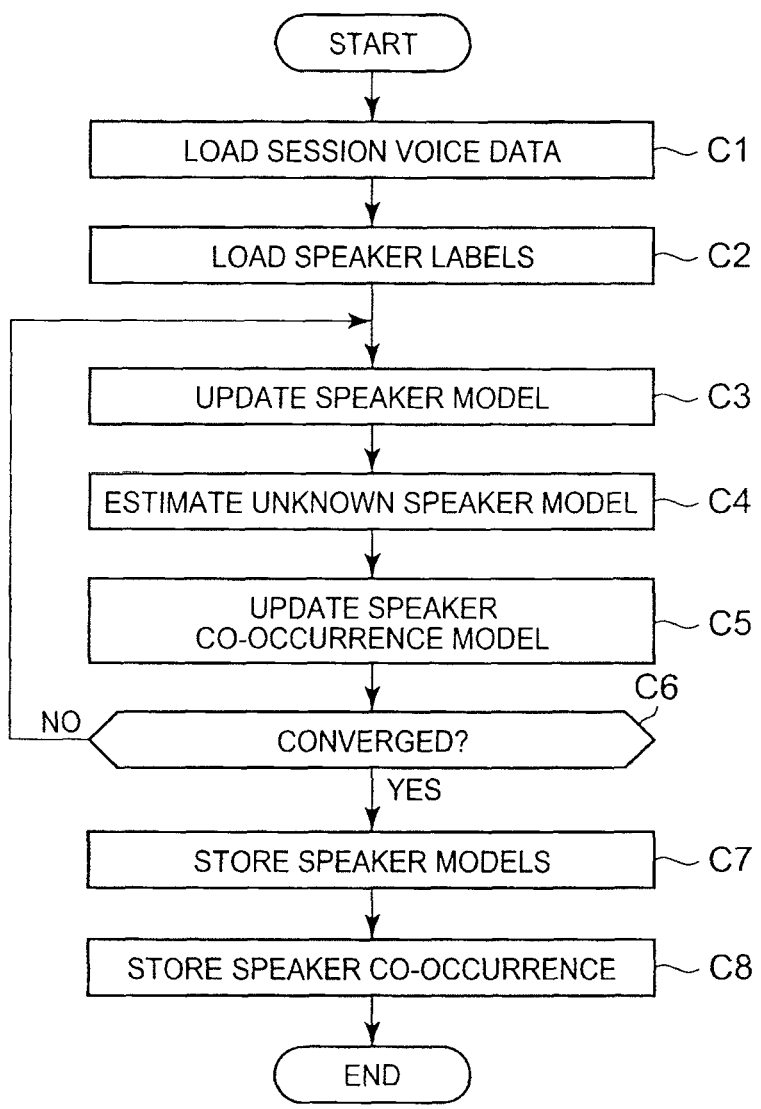
FIG. 9 It depicts a flow chart showing an example of the operation of learning means in the second exemplary embodiment.

Next, the operation of this exemplary embodiment will be described in detail referring to a flow chart of FIG. 9. FIG. 9 is a flow chart showing an example of the operation of the learning means 31 in this exemplary embodiment. The operation of the recognition means 32 is equivalent to that of the recognition means 12 in the first exemplary embodiment, and thus repeated explanation thereof is omitted for brevity.

First, the speaker model learning means 302, the speaker classification means 303 and the speaker co-occurrence learning means 304 load the voice data stored in the session voice data storage means 300 (step C1 in FIG. 9). The speaker model learning means 302 and the speaker co-occurrence learning means 304 further load the already-known speaker labels stored in the session speaker label storage means 301 (step C2).

Subsequently, the speaker model learning means 302 updates the speaker models using the estimation result of the unknown speaker labels calculated by the speaker classification means 303 and the estimation result of the belonging cluster of each session calculated by the speaker co-occurrence learning means 304 (step C3).

The speaker classification means 303 receives the speaker models from the speaker model learning means 302 and receives the speaker co-occurrence model from the speaker co-occurrence learning means 304, respectively, and stochastically estimates the labels to be assigned to the utterances whose speaker labels are unknown according to the aforementioned expression (11), for example (step C4).

The speaker co-occurrence learning means 304 stochastically estimates the belonging cluster for each session according to the aforementioned expression (5), for example, and updates the speaker co-occurrence model according to the aforementioned expression (12), for example, by referring to the estimation result of the unknown speaker labels calculated by the speaker classification means 303 (step C5).

At this point, the convergence judgment is made (step C6). If not converged yet, the process returns to the step C3. If converged, the speaker model learning means 302 stores the speaker models in the speaker model storage means 305 (step C7) and the speaker co-occurrence learning means 304 stores the speaker co-occurrence model in the speaker co-occurrence model storage means 306 (step C8).

Incidentally, the order of execution of the steps C1 and C2 and that of the steps C7 and C8 may be set arbitrarily. The order of the steps S33-S35 may also be changed arbitrarily.

As described above, according to this exemplary embodiment, even when the speaker labels are unknown in the learning means 31, the speaker models and the speaker co-occurrence model are acquired by the estimation of the speaker labels by the speaker classification means 303 and the cooperative and iterative operation of the three means including the speaker model learning means 302 and the speaker co-occurrence learning means 304. Therefore, the speakers can be recognized with high accuracy even when part or all of the speaker labels do not exist. The other features are equivalent to those of the first exemplary embodiment.

<Third Exemplary Embodiment>

Figure 10:
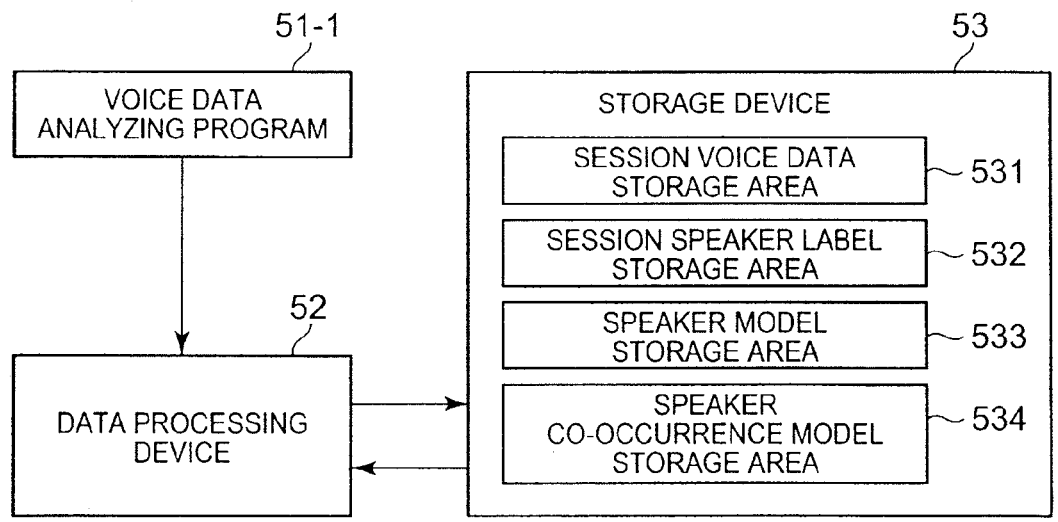
FIG. 10 It depicts a block diagram showing an example of the configuration of a voice data analyzing device (model generating device) in accordance with a third exemplary embodiment.

Next, a third exemplary embodiment of the present invention will be described. FIG. 10 is a block diagram showing an example of the configuration of a voice data analyzing device (model generating device) in accordance with the third exemplary embodiment of the present invention. As shown in FIG. 10, the voice data analyzing device of this exemplary embodiment comprises a voice data analyzing program 51-1, a data processing device 52 and a storage device 53. The storage device 53 includes a session voice data storage area 531, a session speaker label storage area 532, a speaker model storage area 533 and a speaker co-occurrence model storage area 534. Incidentally, this exemplary embodiment illustrates an example of a configuration when the learning means in the first or second exemplary embodiment (learning means 11 or 31) is implemented by a computer operated by a program.

The voice data analyzing program 51-1 is loaded into the data processing device 52 and controls the operation of the data processing device 52. In the voice data analyzing program 51-1, the operation of the learning means in the first or second exemplary embodiment (learning means 11 or 31) has been described using a programming language. Specifically, under the control of the voice data analyzing program 51-1, the data processing device 52 executes processes identical with the processes of the speaker model learning means 102 and the speaker co-occurrence learning means 104 in the first exemplary embodiment or the processes of the speaker model learning means 302, the speaker classification means 303 and the speaker co-occurrence learning means 304 in the second exemplary embodiment. Thus, the data processing device 52 loads the voice data and the speaker labels stored in the session voice data storage area 531 and the session speaker label storage area 532 in the storage device 53, respectively, and stores the speaker models and the speaker co-occurrence model in the speaker model storage area 533 and the speaker co-occurrence model storage area 534 in the storage device 53, respectively.

As described above, by the voice data analyzing device (model generating device) of this exemplary embodiment, the speaker models and the speaker co-occurrence model effective for the learning or recognition of speakers from voice data including voices uttered by a plurality of speakers can be acquired. Thus, by using the acquired speaker models and speaker co-occurrence model, the speakers can be recognized with high accuracy.

<Fourth Exemplary Embodiment>

Figure 11:
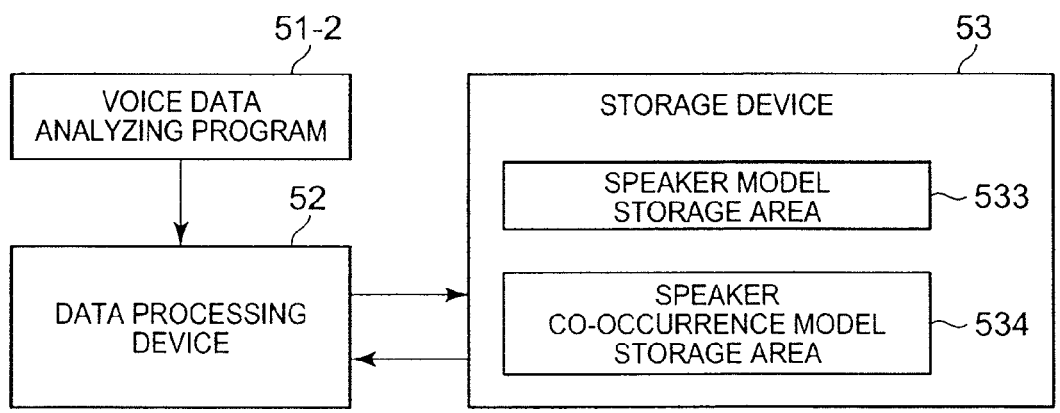
FIG. 11 It depicts a block diagram showing an example of the configuration of a voice data analyzing device (speaker recognition device) in accordance with a fourth exemplary embodiment.

Next, a fourth exemplary embodiment of the present invention will be described. FIG. 11 is a block diagram showing an example of the configuration of a voice data analyzing device (speaker recognition, device) in accordance with the fourth exemplary embodiment of the present invention. As shown in FIG. 11, the voice data analyzing device of this exemplary embodiment comprises a voice data analyzing program 51-2, a data processing device 52 and a storage device 53. The storage device 53 includes a speaker model storage area 533 and a speaker co-occurrence model storage area 534. Incidentally, this exemplary embodiment illustrates an example of a configuration when the recognition means in the first or second exemplary embodiment (recognition means 12 or 32) is implemented by a computer operated by a program.

The voice data analyzing program 51-2 is loaded into the data processing device 52 and controls the operation of the data processing device 52. In the voice data analyzing program 51-2, the operation of the recognition means in the first or second exemplary embodiment (recognition means 12 or 32) has been described using a programming language. Specifically, under the control of the voice data analyzing program 51-2, the data processing device 52 executes a process identical with the process of the session matching means 107 in the first exemplary embodiment or the process of the session matching means 307 in the second exemplary embodiment. Thus, the data processing device 52 executes the speaker recognition for an arbitrary piece of voice data by referring to the speaker models and the speaker co-occurrence model stored in the speaker model storage area 533 and the speaker co-occurrence model storage area 534 in the storage device 53, respectively. Incidentally, the speaker model storage area 533 and the speaker co-occurrence model storage area 534 are assumed to have previously stored speaker models and a speaker co-occurrence model equivalent to those generated by the learning means in the first or second exemplary embodiment or the data processing device 52 controlled by the voice data analyzing program 51-1 in the above exemplary embodiment.

As described above, by the voice data analyzing device (speaker recognition device) of this exemplary embodiment, the speaker recognition can be executed in consideration of the consistency of the co-occurrence of speakers in the whole session by use of not only the speaker models but also the speaker co-occurrence model acquired by modeling (expressing by mathematical expressions, etc.) the co-occurrence relationship among the speakers. Thus, the speakers can be recognized with high accuracy. Incidentally, this exemplary embodiment is equivalent to the first or second exemplary embodiment except that the calculation process for the modeling can be left out thanks to the speaker models and the speaker co-occurrence model already stored previously.

It should be noted that one data processing device 52 can be configured to execute the processes of the learning means and the recognition means in the first or second exemplary embodiment by making the data processing device 52 load a voice data analyzing program 51 written as a combination of the voice data analyzing program 51-1 in the third exemplary embodiment and the voice data analyzing program 51-2 in the fourth exemplary embodiment.

Figure 12:
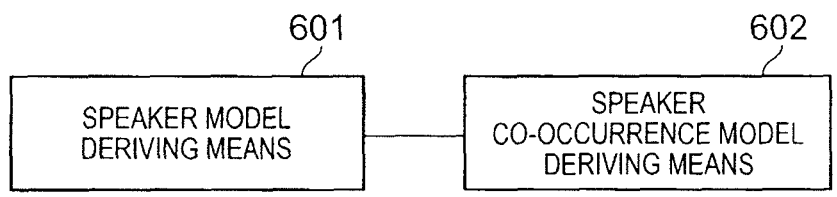
FIG. 12 It depicts a block diagram showing the general outline of the present invention.

In the following, the general outline of the present invention will be explained. FIG. 12 is a block diagram showing the general outline of the present invention. The voice data analyzing device shown in FIG. 12 comprises speaker model deriving means 601 and speaker co-occurrence model deriving means 602.

The speaker model deriving means 601 (e.g., the speaker model learning means 102 and 302) derives speaker models as models each specifying character of voice of each speaker from voice data including a plurality of utterances to each of which a speaker label as information for identifying a speaker has been assigned.

The speaker model deriving means 601 may derive a probability model specifying the appearance probability of a voice feature quantity of each speaker as the speaker model. The probability model can be a Gaussian mixture model or a hidden Markov model, for example.

The speaker co-occurrence model deriving means 602 (e.g., the speaker co-occurrence learning means 104 and 304) derives a speaker co-occurrence model as a model representing the strength of co-occurrence relationship among the speakers from session data, obtained by segmenting the voice data in units of sequences of conversation, by use of the speaker models derived by the speaker model deriving means 601.

For example, the speaker co-occurrence model deriving means 602 may derive a Markov network, which is specified by the appearance probability of each set of speakers having strong co-occurrence relationship (i.e., cluster) and the appearance probability of each speaker in the cluster, as the speaker co-occurrence model.

In such a configuration, the speaker models and the speaker co-occurrence model may be learned by executing iterative calculation based on the maximum likelihood criterion, the maximum a posteriori probability criterion or the Bayesian criterion regarding the voice data and the speaker labels.

Figure 13:
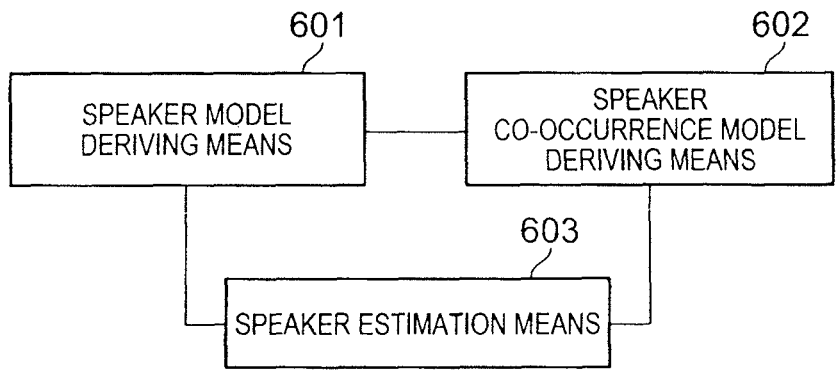
FIG. 13 It depicts a block diagram showing another example of the configuration of the present invention.

FIG. 13 is a block diagram showing another example of the configuration of the voice data analyzing device in accordance with the present invention. As shown in FIG. 13, the voice data analyzing device of the present invention may be configured to further comprise speaker estimation means 603. When the voice data inputted to the speaker model deriving means 601 or the speaker co-occurrence model deriving means 602 includes an utterance to which no speaker label has been assigned, the speaker estimation means 603 (e.g., the speaker classification means 303) estimates the speaker label for the utterance which has been assigned no speaker label by at least referring to the speaker models or the speaker co-occurrence model already derived at that point.

In such a configuration, the speaker model deriving means 601, the speaker co-occurrence model deriving means 602 and the speaker estimation means 603 may be operated successively and iteratively.

Figure 14:
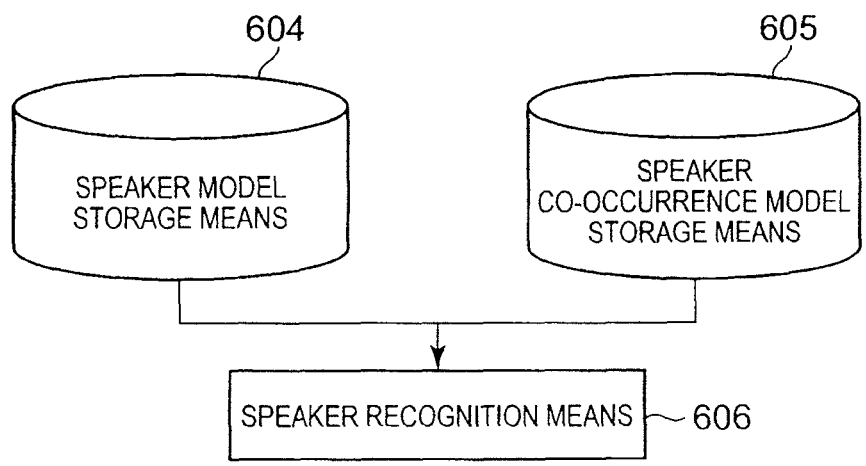
FIG. 14 It depicts a block diagram showing another example of the configuration of the present invention.

FIG. 14 is a block diagram showing still another example of the configuration of the voice data analyzing device in accordance with the present invention. As shown in FIG. 13, the voice data analyzing device of the present invention may be configured to comprise speaker model storage means 604, speaker co-occurrence model storage means 605 and speaker recognition means 606.

The speaker model storage means 604 (e.g., the speaker model storage means 105 and 305) stores speaker models, as models each specifying character of voice of each speaker, derived from voice data including a plurality of utterances to each of which a speaker label as information for identifying a speaker has been assigned.

The speaker co-occurrence model storage means 605 (e.g., the speaker co-occurrence model storage means 106 and 306) stores a speaker co-occurrence model, as a model representing the strength of co-occurrence relationship among the speakers, derived from session data obtained by segmenting the voice data in units of sequences of conversation.

The speaker recognition means 606 (e.g., the session matching means 107 and 307) recognizes which speaker is the speaker of each utterance included in a specified piece of voice data by calculating consistency with the speaker models and consistency of the co-occurrence relationship in the whole voice data in regard to each utterance included in the specified voice data by use of the stored speaker models and speaker co-occurrence model.

Figure 15:
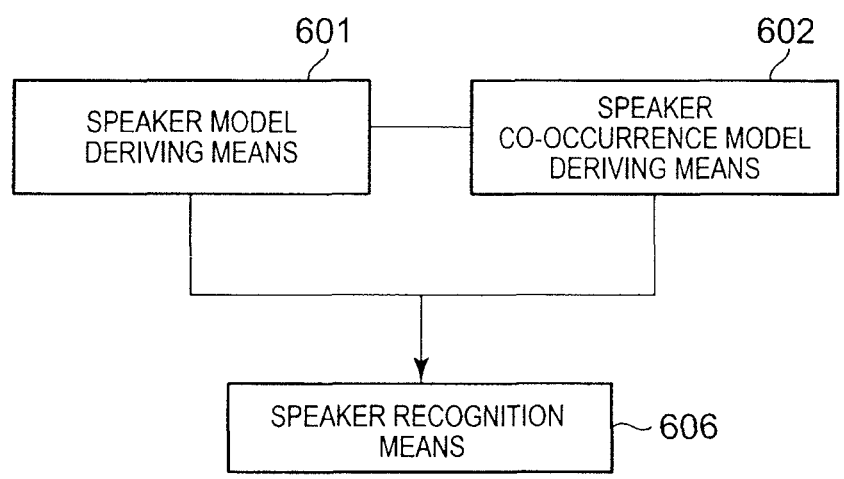
FIG. 15 It depicts a block diagram showing another example of the configuration of the present invention.

Incidentally, the voice data analyzing device of the present invention may also comprise the speaker model deriving means 601 and the speaker co-occurrence model deriving means 602 instead of the storage means as shown in FIG. 15 so as to implement the operation from the model generation to the speaker recognition by one device.

While the present invention has been described above with reference to the exemplary embodiments and, examples, the present invention is not to be restricted to the particular illustrative exemplary embodiments and examples. A variety of modifications understandable to those skilled in the art can be made to the configuration and details of the present invention within the scope of the present invention.

This application claims priority to Japanese Patent Application No. 2009-168290 filed on Jul. 16, 2009, the entire disclosure of which is incorporated herein by reference.

Industrial Applicability

The present invention is applicable to purposes such as a speaker searching device and a speaker matching device for matching an inputted voice with a personnel database storing voices of a great number of speakers. The present invention is applicable also to purposes such as an indexing/searching device to be used for media data including images and voices, or a conference support device and a conference minutes preparation support device for recording statements, comments, etc. made by participants in a conference.

REFERENCE SIGNS LIST

11, 31 learning means
100, 300 session voice data storage means
101, 301 session speaker label storage means
102, 302 speaker model learning means
104, 304 speaker co-occurrence learning means
105, 305 speaker model storage means
106, 306 speaker co-occurrence model storage means
303 speaker classification means
12, 32 recognition means
107, 307, 606 session matching means
51, 51-1, 51-2 voice data analyzing program
52 data processing device
53 storage device
531 session voice data storage area
532 session speaker label storage area
533 speaker model storage area
534 speaker co-occurrence model storage area
601 speaker model deriving means
602 speaker co-occurrence model deriving means
603 speaker estimation means
604 speaker model storage means
605 speaker co-occurrence model storage means
606 speaker recognition means

The invention claimed is:

1. A voice data analyzing device comprising:
   a speaker model deriving unit which derives speaker models as models each specifying character of voice of each speaker from voice data including a plurality of utterances to each of which a speaker label as information for identifying a speaker has been assigned; and
   a speaker co-occurrence model deriving unit which derives a speaker co-occurrence model as a model representing the strength of a co-occurrence relationship in which a plurality of speakers appear in a same conversation, among the speakers from session data obtained by segmenting the voice data in units of sequences of conversation by use of the speaker models derived by the speaker model deriving unit.

2. The voice data analyzing device according to claim 1, further comprising a speaker estimation unit which estimates the speaker label for an utterance which has been assigned no speaker label by at least referring to the speaker models or the speaker co-occurrence model already derived at that point in cases where the voice data inputted to the speaker model deriving unit or the speaker co-occurrence model deriving unit includes such an utterance to which no speaker label has been assigned.

3. The voice data analyzing device according to claim 2, wherein the speaker model deriving unit, the speaker co-occurrence model deriving unit and the speaker estimation unit operate successively and iteratively.

4. The voice data analyzing device according to claim 1, wherein the speaker co-occurrence model is a Markov network which is specified by the appearance probability of each cluster, as a set of speakers having strong co-occurrence relationship, and the appearance probability of each speaker in the cluster.

5. The voice data analyzing device according to claim 1, wherein the speaker model is a probability model specifying the appearance probability of a voice feature quantity of each speaker.

6. The voice data analyzing device according to claim 5, wherein the speaker model is a Gaussian mixture model or a hidden Markov model.

7. The voice data analyzing device according to claim 1, wherein the speaker models and the speaker co-occurrence model are learned by executing iterative calculation based on the maximum likelihood criterion, the maximum a posteriori probability criterion or the Bayesian criterion regarding the voice data and the speaker labels.

8. The voice data analyzing device according to claim 1, further comprising a speaker recognition unit which recognizes which speaker is the speaker of each utterance included in a specified piece of voice data by calculating consistency with the speaker models and consistency of the co-occurrence relationship in the whole voice data in regard to each utterance included in the specified voice data by use of the speaker models derived by the speaker model deriving unit and the speaker co-occurrence model derived by the speaker co-occurrence model deriving unit.

9. The voice data analyzing device according to claim 8, wherein the speaker recognition unit calculates the probability that an utterance corresponds to each speaker and selects a speaker maximizing the probability as the result of the speaker recognition in regard to each utterance.

10. The voice data analyzing device according to claim 9 wherein the speaker recognition unit judges that there exists no corresponding speaker when the probability of the speaker maximizing the probability is less than a prescribed threshold value.

11. A voice data analyzing device comprising:
a speaker model storage unit which stores speaker models, as models each specifying character of voice of each speaker, derived from voice data including a plurality of utterances to each of which a speaker label as information for identifying a speaker has been assigned;
a speaker co-occurrence model storage unit which stores a speaker co-occurrence model, as a model representing the strength of a co-occurrence relationship in which a plurality of speakers appear in a same conversation, among the speakers, derived from session data obtained by segmenting the voice data in units of sequences of conversation; and
a speaker recognition unit which recognizes which speaker is the speaker of each utterance included in a specified piece of voice data by calculating consistency with the speaker models and consistency of the co-occurrence relationship in the whole voice data in regard to each utterance included in the specified voice data by use of the speaker models and the speaker co-occurrence model.

12. A voice data analyzing method comprising:
a speaker model deriving step of deriving speaker models as models each specifying character of voice of each speaker from voice data including a plurality of utterances to each of which a speaker label as information for identifying a speaker has been assigned; and
a speaker co-occurrence model deriving step of deriving a speaker co-occurrence model as a model representing the strength of a co-occurrence relationship in which a plurality of speakers appear in a same conversation, among the speakers from session data obtained by segmenting the voice data in units of sequences of conversation by use of the speaker models derived by the speaker model deriving step.

13. A voice data analyzing method comprising a speaker recognition step of recognizing which speaker is the speaker of each utterance included in a specified piece of voice data by calculating consistency with speaker models and consistency of a co-occurrence relationship in which a plurality of speakers appear in a same conversation, in the whole voice data in regard to each utterance included in the specified voice data by use of the speaker models, as models each specifying character of voice of each speaker derived from voice data including a plurality of utterances to each of which a speaker label as information for identifying a speaker has been assigned, and a speaker co-occurrence model as a model representing the strength of the co-occurrence relationship among the speakers derived from session data obtained by segmenting the voice data in units of sequences of conversation.

14. A non-transitory computer readable information recording medium storing a voice data analyzing program, when executed by a processor, performs a method for
a speaker model deriving process of deriving speaker models as models each specifying character of voice of each speaker from voice data including a plurality of utterances to each of which a speaker label as information for identifying a speaker has been assigned; and
a speaker co-occurrence model deriving process of deriving a speaker co-occurrence model as a model representing the strength of a co-occurrence relationship in which a plurality of speakers appear in a same conversation, among the speakers from session data obtained by segmenting the voice data in units of sequences of conversation by use of the speaker models derived by the speaker model deriving process.

15. A non-transitory computer readable information recording medium storing a voice data analyzing program, when executed by a processor, performs a method for a speaker recognition process of recognizing which speaker is the speaker of each utterance included in a specified piece of voice data by calculating consistency with speaker models and consistency of a co-occurrence relationship in which a plurality of speakers appear in a same conversation, in the whole voice data in regard to each utterance included in the specified voice data by use of the speaker models, as models each specifying character of voice of each speaker derived from voice data including a plurality of utterances to each of which a speaker label as information for identifying a speaker has been assigned, and a speaker co-occurrence model as a model representing the strength of the co-occurrence relationship among the speakers derived from session data obtained by segmenting the voice data in units of sequences of conversation.

* * * * *

UNITED STATES PATENT AND TRADEMARK OFFICE
CERTIFICATE OF CORRECTION

PATENT NO. : 8,954,327 B2
APPLICATION NO. : 13/383150
DATED : February 10, 2015
INVENTOR(S) : Takafumi Koshinaka Page 1 of 1

It is certified that error appears in the above-identified patent and that said Letters Patent is hereby corrected as shown below:

In the Specification

Column 13, Line 66: Delete "($a_l$," and insert -- ($a_i$, --, therefor.

Column 15, Line 6: Delete "$v_y \leftarrow \dfrac{\sum_{n=1}^{N} p(\mid \Xi^{(n)}, \theta)}{\sum_{n=1}^{N} K^{(n)} p(y \mid \Xi^{(n)}, \theta)}$" and insert -- $v_y \leftarrow \dfrac{\sum_{n=1}^{N} p(y \mid \Xi^{(n)}, \theta)}{\sum_{n=1}^{N} K^{(n)} p(y \mid \Xi^{(n)}, \theta)}$ --.

Signed and Sealed this
Twenty-seventh Day of October, 2015

Michelle K. Lee
*Director of the United States Patent and Trademark Office*